United States Patent [19]

Bragin et al.

[11] Patent Number: 4,506,865
[45] Date of Patent: Mar. 26, 1985

[54] VALVE HOUSING

[76] Inventors: Boris F. Bragin, kvartal 50 let Oktyabrya, 52, 60; Petr V. Gladky, bulvar Davydova, 14, kv. 247; Felix D. Markuntovich, 10 mikroraion, 5, kv. 39, all of Voroshilovgrad; Evgeny F. Perepletchikov, ulitsa Suvorova, 34, Borispol Kievskoi oblasti; Isidor I. Frumin, Bolshaya Zhitomirskaya ulitsa, 17, kv. 6, Kiev; Boris Y. Ekber, ulitsa Zoologicheskaya, 3, kv. 73, Moscow, all of U.S.S.R.

[21] Appl. No.: 570,369

[22] Filed: Jan. 13, 1984

[51] Int. Cl.³ .............................................. F16K 27/00
[52] U.S. Cl. .................................... 251/366; 251/326; 251/367; 406/193; 406/192
[58] Field of Search ............... 251/326, 329, 327, 328, 251/366, 367; 406/193, 192; 137/375, 544, 545, 546

[56] References Cited

U.S. PATENT DOCUMENTS

| | | |
|---|---|---|
| 1,518,705 | 12/1924 | Raun .................. 406/193 X |
| 2,350,759 | 6/1944 | Hilmer et al. .................. 406/193 X |
| 2,578,003 | 12/1951 | Garbo .................. 406/193 |
| 4,316,483 | 2/1982 | Jandrasi .................. 251/327 X |

FOREIGN PATENT DOCUMENTS

| | | | |
|---|---|---|---|
| 501591 | 1/1927 | Fed. Rep. of Germany | 406/193 |
| 729880 | 5/1955 | United Kingdom | 406/193 |
| 474925 | 5/1975 | U.S.S.R. | |
| 725973 | 6/1978 | U.S.S.R. | 406/193 |

*Primary Examiner*—Martin P. Schwadron
*Assistant Examiner*—John S. Starsiak, Jr.
*Attorney, Agent, or Firm*—Holman & Stern

[57] ABSTRACT

A valve housing has butt pipes for connection to a pipeline for defining therewith a passage for a flow of a fluid being conveyed, preferably of a slurry. A plurality of ribs are provided along the passage on the lower portion of the wall thereof, each rib extending transversely of the passage. Each rib is of a tear-shaped configuration in its section taken along the longitudinal centerline of the passage, the enlarged portion of the rib facing toward the incoming flow of a fluid being conveyed.

4 Claims, 4 Drawing Figures

VALVE HOUSING

This invention relates generally to pipe transport systems, and more particularly to a valve housing.

The valve housing embodying the present invention can find application for conveying a slurry in a pipe transport line by liquid and gaseous fluids.

The valve housing may also be utilized for transporting loose abrasive materials and other materials, such as liquids, gaseous materials, suspensions, etc.

There is known a valve housing (cf. USSR Inventor's Certificate No. 479,925) comprising arranged coaxially butt pipes for connection to a pipeline to form therewith a straight-flow passage for a fluid carrying abrasive solids to be conveyed therethrough. Arranged in the upper portion of the valve housing to move in a vertical plane is a gate for blocking the straight-flow passage. The lower portion of the inner wall of the valve housing contains a plurality of successive projections and recesses arranged lengthwise of the straight-flow passage. Each of the projections or ribs extends substantially transversely of said straight-flow passage about an arc of a circle of no less than 120°.

Each projection or rib has in a section passing through the longitudinal centerline of the straight-flow passage a shape of a scalene trapezium. The ribs are fabricated from the same material as the valve housing and butt pipes. The ribs are intended to facilitate formation on the lower portion of the inner wall of the valve housing of a bed of solid particles, these solid particles tending to settle and rest between the ribs and subsequently lay thereupon.

The provision of the settled bed of solids prevents the lower portion of the inner wall of the valve housing from being abrased by the particles carried by the fluid being conveyed. In order to reduce resistance to the flow and prevent pressure losses in the valve housing, it is preferable that the depth of the bed of settled particles be as small as possible. However, at such a depth some larger solid particles carried by the flow of fluid tend to penetrate the bed of settled solids.

Further, the ribs of the above valve housing are made of the same material as the housing and butt pipes and therefore are susceptible to fast wear by large abrasive particles penetrating the bed of smaller settled particles. As a result of fast wear of the ribs, the service life of the valve housing and the butt pipes is considerably reduced.

The shape of the ribs in a section taken through the longitudinal centerline of the straight-flow passage of the above known valve housing provides a bed of solid particles between the ribs that is not sufficiently stable especially at increased flow velocities under certain operating conditions, whereby the depth of the bed of settled solids tends to become substantially less than the height of the ribs to result in accelerated wear of the lower portion of the wall of the valve housing.

It is an object of the invention to provide a valve housing wherein ribs at the lower inner wall portion thereof have a shape in a cross-section taken through the longitudinal centerline of a straight-flow passage inside the valve housing which ensures the formation thereon of a stable layer of solids.

This object is accomplished by that in a valve housing having butt pipes for connection to a pipeline for forming therewith a straight-flow passage for a flow of a fluid being conveyed therethrough, the lower portion of the inner wall of the straight-flow passage having a plurality of ribs extending substantially transversely of the straight-flow passage, according to the invention, each of the ribs is tear-shaped in a cross-section taken through the longitudinal centerline of a straight-flow passage, an enlarged portion of the rib facing toward the incoming flow of a fluid being conveyed.

Thanks to the aforedescribed cross-sectional configuration of the ribs the thickened portion of each such rib facing the incoming flow of fluid facilitates the settlement of solids before this thickened rib portion to form a stable bed of solids on the lower portion of the inner wall of the valve housing, the depth of this bed remaining invariable in the course of extended operation of the valve housing. Therewith, larger solid particles carried by the flow in fact fail to penetrate this bed, while the bed itself acts to prevent the ribs and the lower inner walls of the valve housing from abrasion, and wear.

The ribs having the aforedescribed cross-sectional configuration may be hard-faced on the lower portion of the inner wall of the valve housing, the ribs being of a material different from the material of the valve housing.

Preferably, the ribs are fabricated from a wear-resistant material.

This wear-resistant material provides for extended service life of the ribs and durability of the valve housing.

Advisably, the surface of each rib facing the incoming flow of fluid being conveyed is at an angle to a transverse plane passing through the straight-flow passage, the value of this angle not exceeding the value of the friction angle of the solid particles carried by the fluid against the ribs.

The provision of such an angle for each rib makes the bed of solids settled on the lower inner wall of the passage quite stable, the depth of such a bed therefore being stable even at high velocities of the fluid flow.

Preferably, the height of each rib is not in excess of 0.03 to 0.05 the maximum cross-sectional diameter of the straight-flow passage.

When the ratio of the height of each rib to the maximum cross-sectional size of the straight-flow passage or the diameter of such a passage when it is substantially round is less than 0.03, the bed of solids is of insufficient depth to completely cover the ribs, which results in their fast wear.

Conversely, at the above ratio in excess of 0.05 the depth of the bed of solids is quite considerable, although it reduces the cross-sectional area of the straight-flow passage resulting in increased hydraulic resistance and loss of pressure in the valve housing which affects its efficiency.

In view of the foregoing, the valve housing embodying the present invention has an extended service life. Also, it is quite efficient, the efficiency being attained without a loss in pressure of the fluid being conveyed, whereas the costly wear-resistant material is used only for the ribs rather than for the entire valve housing.

The invention will be described now in greater detail with reference to specific embodiments thereof taken in conjunction with the accompanying drawings, in which.

Figure 1:
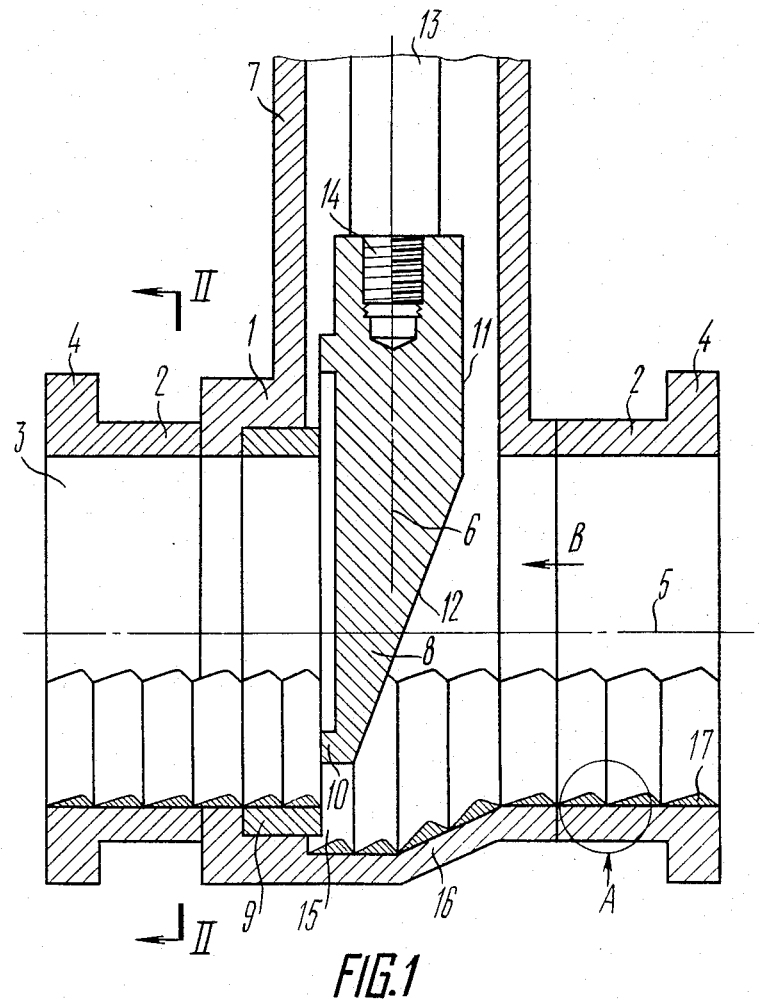
FIG. 1 is a longitudinal sectional view of a valve housing embodying the present invention.

With reference to FIG. 1 the valve housing embodying the present invention comprises coaxially arranged on both sides of the housing butt pipes 2 for connection to a pipeline (not shown) to define therewith a straight-flow passage (3) for a fluid, in this case pulp or slurry, to be conveyed therethrough. The butt pipes 2 are connectable to the pipeline by means of flanges 4. In the embodiment being described the butt pipes 2 are made integral with the valve housing 1. Alternatively, the butt pipes 2 may be connected to the pipeline by other known suitable means, such as threaded connections, welding, soldering, etc.

Other alternative modifications may provide that the butt pipes 2 are rigidly secured to the valve housing 1.

The butt pipes 2 are arranged to be in line with a longitudinal centerline 5 of the valve housing 1. A branch pipe 7 is further provided in the upper portion of the valve housing 1 to follow an axis 6 passing perpendicularly relative to the longitudinal centerline 5, the branch pipe 7 accommodating a valving member 8 to fit a valve seat 9 inside the valve housing 1. A groove or inner shoulder (not indicated by a reference numeral) is provided at the inner wall of the housing 1 to receive the valve seat 9 affixable to the housing 1 by any known suitable means.

The valving member 8 is arranged in line with the vertical axis 6 and engage with the valve seat 9 by an annular projection 10 provided on the periphery of the valving member 8 at the side thereof facing the valve seat 9. A side of the valving member 8 opposite to the abovementioned side thereof in the upper portion of the valving member 8 is generally a flat surface 11 perpendicular to the longitudinal centerline 5 of the valve housing, whereas in the lower portion of the valving member 8 this side is a flat surface 12 inclined relative to the horizontal centerline 5. A cross-sectional area taken in parallel with the horizontal longitudinal centerline 5 and substantially parallel with the vertical axis 6 at the lower portion of the valving member 8 is less than a cross-sectional area taken in a similar manner in the upper portion of the valving member 8 thereby gradually increasing from the lowest end of the valving member 8 as seen in FIG. 1 upwards along the vertical axis 6.

In order to execute reciprocations, the valving member 8 is linked with a drive means (not shown) of any known suitable construction. This linkage to the drive means is effected through a rod 13 affixed to the valving member 8 by any known suitable threaded connection, such as the one shown at 14 in FIG. 1. A recess 15 is provided in the lower portion of the valve housing extending upwards to the longitudinal centerline 5 and serving to accommodate the valving member 8 when it assumes a downmost position, that is when it closes or blocks the straight-flow passage 3.

The cylindrical recess 15 extends to the right-hand butt pipe 2 through a tapered connecting portion 16. The valving member 8 in its downmost position is spaced a certain distance from the lower wall of the cylindrical recess 15, whereby a bed of solid particles of the slurry settled on the bottom of the passage 3 is caused to be shifted rightwards to the butt pipe 2 thus making it possible for the member 8 to completely block the passage 3.

A plurality of inner ribs 17 are arranged in the lower portion of the passage 3.

Figure 2:
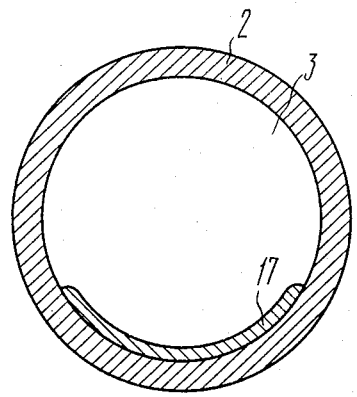
FIG. 2 is a cross-section taken along the line II—II in FIG. 1.

Each of the ribs 17 extends cross-sectionally of the passage 3 about an arc of a circle of no less than 120°, in this case this angle being exactly 120°, as seen best in FIG. 2.

Referring again to FIG. 2, the ribs 17 are arranged directly on the lower portion of the wall of the passage 3 of the butt pipe 2.

Figure 3:
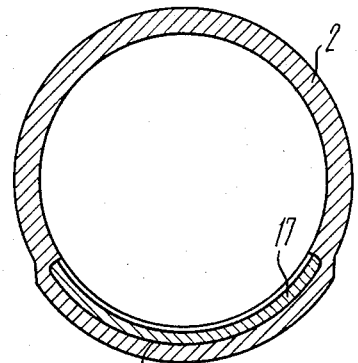
FIG. 3 is a cross-section of a modified form of the valve housing according to the invention wherein the lower portion of a straight-flow passage has a recess with ribs arranged in this recess.

In another embodiment of the invention illustrated in FIG. 3 the ribs 17 are arranged in a recess 17a made in lower portion of the wall of the passage 3.

Such an arrangement of the ribs 17 in the recess 17a results in a reduced hydraulic resistance of the valve housing 1.

Each of the ribs 17 is tear-shaped in a section passing through the longitudinal centerline 5 of the passage 3, as seen best in FIG. 2. The thicker portion of each rib 17 faces the incoming flow of fluid being conveyed through the passage 3, the direction of this flow being indicated by B in FIG. 1.

The aforedescribed shape of the ribs 17 facilitates the settlement of solids before the thickened portion thereof.

The ribs 17 are fabricated from a wear-resistant material hard-faced on the inner wall of the passage 3. This wear-resistant material extends the service life of the valve housing, whereas hard-facing saves the amount of such costly material needed for forming the ribs.

Figure 4:
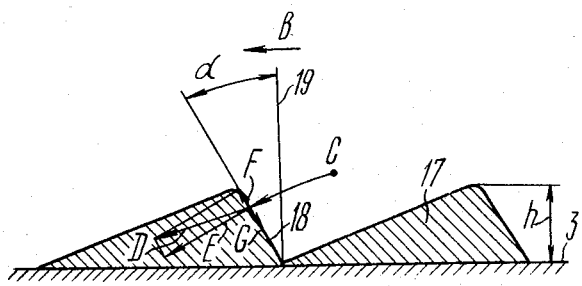
FIG. 4 is an enlarged view of section A in FIG. 1.

With reference to FIG. 4, the surface 18 of each of the ribs 17 which faces the incoming flow of fluid is inclined at an angle $\alpha$ to plane 19 passing transversely of the passage 3, the fluid being conveyed in this case being a slurry or mixture of solid mineral particles with water. The angle $\alpha$ is equal to the angle of friction of the solid mineral particles carried by the fluid on the ribs 17. Experiments have shown that at this value of the angle $\alpha$ the depth of the bed of solids settled between the ribs 17 is not diminished even when the speed with which the fluid is conveyed is increased, which prevents the lower portion of the passage 3 from being abrased or worn out.

Each rib 17 has a height h which is 0.04 the diameter of the passage 3. At such a value of the height h of the ribs 17 the bed of settled solids prevents to a sufficient extent the lower portion of the passage 3 from premature wear; this height of the ribs 17 further fails to result in an increase of hydraulic resistance to flow inside the valve housing 1 or loss of pressure therein.

The valve housing according to the invention operates in the following manner.

When the valving member 8 is moved upwards, a port in the valve seat 9 opens for the fluid flow moving in the direction indicated by B to pass from the pipeline to the right butt pipe 2 as seen in FIG. 1 and thereafter be conveyed through the open valve seat 9 and escape from the valve housing 1. This flow carries abrasive solids by virtue of the fact that, as is known a hydrodynamic lift force produced by the flow of fluid being conveyed exceeds the gravitational force of each solid particle. Since the velocity of the fluid flow in the vicinity of the ribs 17 is less than the flow velocity in proximity to the longitudinal centerline 5, this lift force is overcome by the gravitational force of the solid particles, whereby each solid particle tends to settle down and be carried by the flow lengthwise of the passage 3.

Therewith, the path of solid particles becomes curvilinear, as shown by C in FIG. 4. Upon colliding with the surface 18 of the rib 17 facing the flow, each solid particle acts on the surface 18 with a force indicated by D. Components of the force D are force E normal to the surface 18 and force F and tangential thereto. The tangential force F is equal to the force E multiplied by the tangent of the angle $\alpha$. The tendency of the force F to push the solid particle upwards is countered by a force G, which is a friction force of the solid particle against the surface 18 of the rib 17, this force G being equal to the force F multiplied by the tangent of the friction angle.

Because the value of the angle $\alpha$ is substantially less than the angle of friction of the solids against the ribs 17, the force G is at any time greater than the force F and therefore these solids tend to settle between the ribs 17 and maintain their settled position even at increased velocity of the fluid being conveyed. As a result, a stable bed of settled solids is formed serving to prevent the lower portion of the inner wall of the valve housing from abrasion and wear.

At the height of the ribs 17 of 0.04 the cross-sectional diameter 19 of the passage 3 the bed of settled solids prevents sufficiently well the lower portion of the inner wall of the valve housing 1 from being abrased by such solids carried by the fluid flow while resulting in virtually no increase in the hydraulic resistance of the interior of the valve housing 1.

The valve housings embodying the present invention have shown exellent results when tested for loose abrasives pipe transport in the coal industry. Service life of such valve housings exceeded several fold that of the known valve housing constructions used for the same purpose without entailing a substantial increase in hydraulic resistance to the flow of fluids being conveyed.

We claim:

1. A valve housing for installation in a pipeline, having: butt pipes for connection to said pipeline for defining therewith a straight-flow passage for a flow of a fluid being conveyed; a plurality of ribs provided along the straight-flow passage on the lower portion of its wall, each passage extending substantially transversely of the straight-flow passage; each of said plurality of ribs having in a section taken through the longitudinal centerline of the straight-flow passage a tear-shaped configuration, the enlarged portion of the rib facing toward the incoming flow of a fluid being conveyed.

2. A housing according to claim 1, wherein each of said plurality of the ribs is made of a wear-resistant material.

3. A housing according to claim 1, wherein the surface of each of said plurality of ribs facing toward the incoming flow a fluid being conveyed makes with the plane extending transversely of the straight-flow passage an angle which does not exceed the angle of friction of solid particles of a fluid being conveyed on the plurality of said ribs.

4. A housing according to claim 1, wherein the height of each of the plurality of said ribs is not in excess of 0.03–0.05 of the maximum cross-sectional dimension of the straight-flow passage.

* * * * *